3,296,054
METHOD OF HEAT SEALING TREATED RESIN FILM
Gordon D. McCann, Midland, Mich., assignor to The Dow Chemical Company, Midland, Mich., a corporation of Delaware
No Drawing. Filed Mar. 28, 1963, Ser. No. 268,586
14 Claims. (Cl. 156—308)

The above application is a continuation-in-part of application Serial No. 139,068, filed September 19, 1961.

This invention relates to the heat sealing of plastic film. It more particularly relates to a method of heat sealing oriented alkenyl aromatic foils and films.

The invention is particularly adapted to be practiced with swellable, integral, solid oriented styrene polymer film or sheets. Such a polymer, which may have an essentially linear molecular configuration or be in a cross-linked form, is employed herein as being generally representative of alkenyl aromatic compounds of the type that contain at least about 50 weight percent of at least one polymerized alkenyl aromatic compound or monomer having the general formula: Ar—CR=CH$_2$, wherein R is hydrogen or methyl and Ar is an aromatic radical, advantageously of the benzene series, of from 6 to 10 carbon atoms (including the carbon atoms in any ring substituents on the aromatic nucleus). Thermoplastic polymers and copolymers of styrene and polymers and copolymers of $\alpha$-methyl styrene, ar-methyl styrene (or vinyl toluene), the several mono- and di-chlorostyrenes and ar-dimethyl styrenes, including copolymers thereof with such materials as vinylidene chloride and acrylonitrile; and graft copolymers with other polymeric substances (such as other elastomeric polymers) may frequently be utilized with benefits commensurate with or in excess of those which are derivable from employment of polystyrene alone.

Such oriented alkenyl aromatic resin films and foils are not readily heat sealed by conventional techniques. When these materials are placed between the jaws of a conventional heat sealer and heat and pressure applied, an unsatisfactory seal is generally obtained. If the temperature is sufficiently high to cause a strong, reliable seal to be formed, it is also sufficiently high to cause deorientation and subsequent shrinkage of the film. Deorientation and shrinkage cause an unsatisfactory and unsightly seal which, generally, is not commerically acceptable. However, if lower temperatures are used in forming the seal in such a manner that no appreciable deorientation takes place, if any seal or weld between the material to be joined is formed, it is weak and provides an inadequate bond for most practical purposes.

Many attempts have been made to provide a surface coating or treatment to allow the heat sealing without deorientation. Although some of these techniques were successful, usually the sealing improvements were made at a sacrifice in the "blocking" characteristics of the final product. The term "blocking" as used herein refers to the tendency of two surfaces of a plastic sheet to adhere to one another after being in contact for a period of time. In the case of the plastic materials employed in the present invention, the tendency to block increases with increasing temperature. Thus, any treatment of an alkenyl aromatic resin surface to facilitate heat sealing must not increase the blocking tendencies of the material below a useful temperature.

It is an object of this invention to provide a method of treating oriented alkenyl aromatic film and foils to render them heat sealable without deorienting the material.

It is a further object of this invention to provide an improved method of joining alkenyl aromatic film comprising surface treating and subsequent sealing.

It is another object of this invention to provide a method of making a strong, clear heat seal between adjacent alkenyl aromatic surfaces without causing deorientation thereof, and provide a surface treatment which does not block at normal temperature.

These benefits and other advantages are readily achieved in accordance with the invention by applying to the surface of an alkenyl aromatic resin film an aqueous solution of from about 0.025 percent to about 10 percent by weight (based on the total weight of the solution) of a polyglycol compound of the formula:

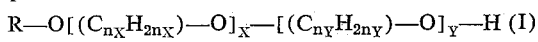

wherein $n_x$ and $n_y$ are integers from 2 to 3, $x$ and $y$ are integers having individual values of from 0 to 20 inclusive, and having a sum of from 1 to 20 inclusive, R is a member selected from the group consisting of (a) alkaryl groups of the formula:

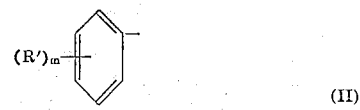

wherein $m$ is an integer from 1 to 4 and R' is an alkyl group containing 2 to 20 carbon atoms; (b) alkyl groups containing from 8 to 13 carbon atoms, and (c) mixtures thereof to give a coating weight on said surfaces of from about 0.118 milligram per square foot to about 148 milligrams per square foot of said compound, removing the water from said coating by evaporation and subsequently heat sealing said film at a temperature of from about 60° centigrade to about 88° centigrade.

Polyglycol compounds employed in the practice of the present invention are commercially available under a variety of trade designations such as Triton, nonionic octylphenoxyethanol (OPE), and the like. The polyglycol hydrophylic side chain of the molecule is prepared by the condensation of one or more moles of ethylene oxide or propylene oxide or mixtures thereof. The substituted phenolic components of the reaction mixture utilized in preparing treating agents used in the practice of the invention beneficially may be pure compounds or mixtures of various isomers when such exist. For example, di-(secondary butyl) phenol exists in various isomeric forms such as 2,3-, 2,4-, 2,5-, 2,6-, and the 3,5-isomer, any one or mixture of such isomers are employed to achieve substantially commensurate results. The resultant compounds employed in the practice of the invention have sufficient water solubility or dispersibility to permit them to form stable dispersions or solutions in water which maintain a reasonably uniform concentration. Such solutions are readily prepared by the addition of water to the polyglycol compound and vigorous agitation until a clear solution or uniform dispersion is obtained. Alternately the addition of the polyglycol to water with agitation is eminently satisfactory.

The aqueous polyglycol solutions are readily applied to films or foils of alkenyl aromatic resins by conventional means such as spraying, brushing, dipping, rolling, and the like. Usually, it is advantageous to apply the aqueous glycol solution at a temperature as high as possible in order to facilitate drying. Optimum drying temperatures vary slightly depending on the particular composition of the polyglycol. At extremely low concentrations drying of the polyglycol solution is accomplished at high temperature such as from about 165° to about 185° Fahrenheit. When the higher concentrations of the polyglycol in water are employed, uniform distribution of the polyglycol advantageously is achieved by drying from about 70° to about 80° Fahrenheit. Although the polyglycol may be present in the solution from a concentration of about 0.025 percent by weight to about 10 percent by weight, it is often advantageous to employ a concentration of from about 0.2 percent to 0.5 percent based on the weight of the total solution and to dry the wet coated film at a temperature of between 150° Fahrenheit and 185° Fahrenheit. These conditions permit optimum control of coating weight with conventional equipment and permit the rapid drying of the film and give maximum production rates.

Operative seals are obtained when coating weights of from about 0.118 milligram per square foot to about 148 milligrams per square foot. However, a particularly beneficial range wherein maximum heat seal strength and a minimum polyglycol is present is from about 0.8 milligram per square foot to 2.4 milligrams of polyglycol per square foot of alkenyl aromatic resin surface coated.

Polyglycols employed in the practice of the present invention result in a heat sealable alkenyl aromatic resin which is nonblocking at temperatures of up to 122° Fahrenheit, if dried below 185° Fahrenheit. Thus, if maximum sealing ease and resistance to blocking is desired, drying temperatures should be maintained below 185° Fahrenheit and preferably between 165° Fahrenheit and 185° Fahrenheit. Below 165° Fahrenheit the heat seal strength decreases slightly.

Film treated in accordance with the invention is readily heat sealed by employing conventional heat sealing apparatus such as jaw type sealers including smooth jaw sealers, separated jaw sealers, and the like. Continuous heat sealing apparatus of the band and roller type are also beneficially employed.

The following examples serve to illustrate the invention but are not to be construed as limiting thereto.

*Example I.*—A 1 mil thick oriented polystyrene film was coated with a 4 mil thick wet film of an aqueous solution of 0.5 percent of the condensation product of 1 mole di-(secondary butyl) phenol and 10 moles of ethylene oxide which is represented by Formula I, where $R'$ is a secondary butyl group, $n_x$ is 2, $m$ is 2, $x$ is 10, and $y$ is 0. The wet film was dried in a forced air oven at a temperature between 150° and 185° Fahrenheit for a period of 2 minutes. The treated film was severed into 2 portions and heat sealed under a pressure of about 100 grams per square inch for a period of 1 second. The resultant seal had a strength of about 250 grams per inch when tested by pulling adjacent portions of the film, that is, peeling the seal apart. The resultant film was found to be block-free at 122° Fahrenheit.

*Example II.*—In a manner similar to Example I, with the exception that the polyglycol compound employed was the condensation product of 1 mole di-(secondary butyl) phenol, 4 moles of propylene oxide and 12 moles of ethylene oxide, which is represented by Formula I, when $R'$ is a secondary butyl group, $n$ is 2, $x$ is 4, $n_x$ is 3, $n_y$ is 2, and $y$ is 12, a coated polystyrene film was prepared. The heat sealing and block results obtained were commensurate with those of Example I.

*Example III.*—In a manner similar to Example I, with the exception that the polyglycol compound employed was the condensation product of di-(secondary butyl) phenol and 10 moles of ethylene oxide, which is represented by Formula I when $R'$ is a secondary butyl group, $m$ is 2, $n_x$ is 2, $x$ is 10, and $y$ is 0, a coated polystyrene film was prepared. The heat sealing and block results obtained were commensurate with those of Example I.

*Example IV.*—In a manner similar to Example I, with the exception that the polyglycol compound employed was the condensation product of tri-decyl alcohol and 8 moles of ethylene oxide, which is represented by Formula I when $R$ is a tri-decyl group, $n_x$ is 2, $x$ is 8, and $y$ is 0, a coated film was prepared. The heat seal and block results obtained were commensurate with those of Example I.

*Example V.*—In a manner similar to Example I, with the exception that the polyglycol compound employed was the condensation product of t-octyl phenol with 1 mole of ethylene oxide, which is represented by Formula I when $R$ is a t-octyl group, $n_x$ is 2, $x$ is 1 and $y$ is 0, a coated film was prepared. The heat seal and block results obtained were commensurate with those of Example I.

*Example VI.*—In a manner similar to Example I, with the exception that the polyglycol compound employed was condensation product of t-octyl phenol with 3 moles of ethylene oxide, which is represented by Formula I when $R$ is a t-octyl group, $m$ is 1, $x$ is 3, $n_x$ is 2 and $y$ is 0, a coated film was prepared. The heat seal and block results obtained were commensurate with those of Example I.

*Example VII.*—In a manner similar to Example I, with the exception that the polyglycol compound employed was the condensation product of t-octyl phenol with 5 moles of ethylene oxide, which is represented by Formula I when $R'$ is a t-octyl group, $m$ is 1, $n_x$ is 2, $x$ is 5, and $y$ is 0, a coated polystyrene film was obtained. The results of heat seal and block obtained were commensurate with those of Example I.

*Example VIII.*—In a manner similar to Example I, with the exception that the polyglycol compound employed was the condensation product of t-octyl phenol with 8 moles of ethylene oxide which is represented by Formula I when $R'$ is a t-octyl group, $m$ is 1, $n_x$ is 2, $x$ is 8, and $y$ is 0, a coated film was prepared. The heat seal and block results obtained were commensurate with those of Example I.

*Example IX.*—In a manner similar to Example I, with the exception that the polyglycol compound employed was condensation product of t-octyl phenol with 10 moles of ethylene oxide which is represented by Formula I when $R'$ is a t-octyl group, $m$ is 1, $n_x$ is 2, $x$ is 10 and $y$ is 0, a coated film was prepared. The heat seal and block results obtained were commensurate with those of Example I.

*Example X.*—In a manner similar to Example I, with the exception that the polyglycol compound employed was the condensation product of t-octyl phenol with 13 moles of ethylene oxide, which is represented by Formula I when $R'$ is a t-octyl group, $m$ is 1, $n_x$ is 2, $x$ is 13, and $y$ is 0, a coated film was prepared. The heat seal and block results obtained were commensurate with those of Example I.

*Example XI.*—In a manner similar to Example I, with the exception that the polyglycol compound employed was the condensation product of t-octyl phenol with 16 moles of ethylene oxide, which is represented by Formula I when $R'$ is a t-octyl group, $m$ is 1, $n_x$ is 2, $x$ is 16, and $y$ is 0, a coated film was prepared. The heat seal and block results obtained were commensurate with those of Example I.

When various other compounds including the reaction product of octyl alcohol, 3 moles of ethylene oxide and 5 moles of propylene oxides, which is represented by Formula I when $R$ is an octyl group, $n_x$ is 2, $x$ is 3, $n_y$ is 3 and $y$ is 5; the reaction product of tertiary octyl phenol with 7 moles of ethylene oxide and 4 moles propylene oxide, which is represented by the Formula I when $R'$ is a t-octyl group, $m$ is 1, $n_x$ is 2, $x$ is 7, $n_y$ is 3 and $y$ is 4; the reaction product of di-(secondary butyl) phenol and 17 moles of propylene oxide, which is represented by Formula I when $R'$ is a secondary butyl group, $m$ is 2, $x$ is 0, $n_y$ is 3, and $y$ is 17; the reaction product of ethyl phenol and 7 moles of ethylene oxide, which is represented by Formula I when $R'$ is an ethyl group, $m$ is 1, $n_x$ is 2, $x$ is 7, and $y$ is 0; the reaction product of decylalcohol and 14 moles of propylene oxide, which is represented by Formula I when $R$ is a decyl group, $x$ is 0, $n_y$ is 3 and $y$ is 14; the reaction product of diethyl phenol, 3 moles of ethylene oxide and 17 moles of propylene oxide which is represented by Formula I when $R'$ is an ethyl group, $m$ is 2, $n_x$ is 2, $x$ is 3, $n_y$ is 3, $y$ is 17; the reaction product of dodecyl alcohol and 20 moles of propylene oxide which is represented by Formula I when R is a dodecyl group, $x$ is 0, $n_y$ is 3 and $y$ is 20; the reaction product of tetrabutyl phenol and 6 moles of ethylene oxide, which is represented by Formula I when R is a butyl group, $m$ is 4, $n_x$ is 2, $x$ is 6, and $y$ is 0, and the like, are applied to alkenyl aromatic resinous surfaces in a manner similar to Example I, result in a block free film (up to 50° centigrade) which is heat sealed to give high strength seals.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. The method of improving the heat sealing characteristic of a film to a like body comprising:
    applying to the surface of an alkenyl aromatic resin film an aqueous solution consisting essentially of from about 0.025 percent to about 10 percent by weight (based on the total weight of the solution), of a polyglycol compound of the formula:

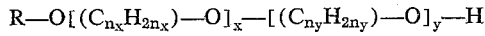

wherein $n_x$ and $n_y$ are integers from 2 to 3, and $x$ and $y$ are integers having individual values from 0 to 20 inclusive and having a sum of from 1 to 20 inclusive R is a member selected from the group consisting of
    (a) alkaryl radicals of the formula:

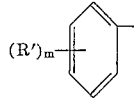

wherein $m$ is an integer from 1 to 4 and R' is an alkyl group containing 2 to 20 carbon atoms, and
    (b) alkyl radicals containing from 8 to 13 carbon atoms;
    to give a coating weight on said surface of said compound of from about 0.118 milligram per square foot to about 148 milligrams per square foot of surface
    drying said coating and subsequently
    heat sealing said film at a temperature of from about 60° centigrade to about 88° centigrade.

2. The method of claim 1, wherein said coating weight is from about 0.8 milligram of the compound per square foot of coated surface to about 2.4 milligrams.

3. The method of improving the heat sealing characteristic of a film to a like body comprising:
    applying to the surface of an alkenyl aromatic resin film an aqueous solution consisting essentially of from about 0.025 percent to about 10 percent by weight, based on the total weight of the solution, of a polyglycol compound of the formula:

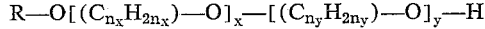

wherein $n_x$ and $n_y$ are integers from 2 to 3, $x$ and $y$ are integers having individual values of from 0 to 20 inclusive, and having a sum of from 1 to 20 inclusive, R is an alkaryl radical of the formula:

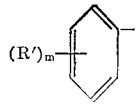

wherein $m$ is an integer from 1 to 4, and R' is an alkyl group containing 2 to 20 carbon atoms,
    to give a coating weight of said compound on said surface of from about 0.118 milligram per square foot to about 148 milligrams per square foot
    drying said coating and subsequently
    heat sealing said film at a temperature of from about 60° centigrade to about 88° centigrade 4. The method of claim 3, wherein the polyglycol compound has the formula of claim 3, wherein R' is a secondary butyl group, $m$ is 2, $n_x$ is 2, $x$ is 10, and $y$ is 0.

5. The method of claim 3, wherein the polyglycol compound has the formula of claim 3, wherein R' is a secondary butyl group, $m$ is 2, $n_x$ is 3, $x$ is 4, $n_y$ is 2, and $y$ is 12.

6. The method of heat sealing a film comprising:
    applying to the surface of an alkenyl aromatic resin film an aqueous solution consisting essentially of from about 0.025 percent to about 10 percent by weight, based on the total weight of the solution, of a polyglycol compound of the formula:

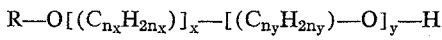

wherein $n_x$ and $n_y$ are integers from 2 to 3, $x$ and $y$ are integers having individual values of from 0 to 20 inclusive, and having a sum of from 1 to 20 inclusive, R is an alkyl radical containing from 8 to 13 carbon atoms in the alkyl group thereof to give a coating weight of said compound on said surface of from about 0.118 milligram per square foot to about 148 milligrams per square foot,
    drying said coating and subsequently
    heat sealing said film at a temperature of from about 60° centigrade to about 88° centigrade.

7. The method of claim 6, wherein the polyglycol compound has a formula in accordance with claim 6, wherein R is a tridecyl radical, $x$ is 10, $n_x$ is 2, and $y$ is 0.

8. The method of treating a film to provide heat sealing characteristics therein comprising:
    applying to the surface of an alkenyl aromatic resin film an aqueous solution consisting essentially of from about 0.025 percent to about 10 percent by weight, based on the total weight of the solution, of a polyglycol compound of the formula:

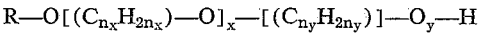

wherein $n_x$ and $n_y$ are integers from 2 to 13, $x$ and $y$ are integers having individual values of from 0 to 20 inclusive, and having a sum of from 1 to 20 inclusive, R is a member selected from the group consisting of
    (a) alkaryl radicals of the formula:

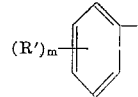

wherein $m$ is an integer of from 1 to 4 and R' is an alkyl group containing 2 to 20 carbon atoms and (b) alkyl radicals containing from 8 to 13 carbon atoms,
    to give a
    coating weight of said compound on said surface of from about 0.118 milligram per square foot to about 148 milligrams per square foot and
    drying said coating.

9. The method of treating a film to provide heat sealing characteristics therein, comprising:
    applying to the surface of an alkenyl aromatic resin film an aqueous solution consisting essentially of from about 0.025 percent to about 10 percent by weight (based on the total weight of the solution), of a polyglycol compound of the formula:

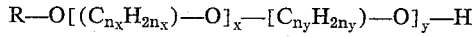

wherein $n_x$ and $n_y$ are integers from 2 to 3, $x$ and $y$ are integers having individual values of from 0 to 20 inclusive, and having a sum of from 1 to 20 inclusive, R is an alkaryl radical of the formula:

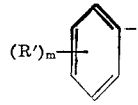

wherein $m$ is an integer from 1 to 4 and R' is an alkyl group containing 2 to 20 carbon atoms, to give a coating weight of said compound on said surface of from about 0.118 milligram per square foot to about 148 milligrams per square foot and drying said coating.

10. The method of claim 9, wherein the polyglycol compound having the formula of claim 9, wherein R' is a secondary butyl group, $m$ is 2, $n_x$ is 2, $x$ is 10 and $y$ is 0.

11. The method of claim 9, wherein the polyglycol compound has the formula of claim 9, wherein R' is a secondary butyl group, $m$ is 2, $x$ is 4, $y$ is 12, $n_x$ is 3 and $n_y$ is 2.

12. The method of treating film to provide heat sealing characteristics therein, comprising:

applying to the surface of an alkenyl aromatic resin film an aqueous solution consisting essentially of from about 0.025 percent to about 10 percent by weight, based on the total weight of the solution, of a polyglycol compound of the formula:

R—O[($C_{n_x}H_{2n_x}$)—O]$_x$—[($C_{n_y}H_{2n_y}$)—O$_y$—H]

wherein $n_x$ and $n_y$ are integers from 2 to 3, $x$ and $y$ are integers having individual values of from 0 to 20 inclusive, and having a sum of from 1 to 20 inclusive, R is an alkyl radical containing from 8 to 13 carbon atoms, to give a coating weight of said compound on said surface of from about 0.118 milligram per square foot to about 148 milligrams per square foot, and drying said coating.

13. The method of claim 9, wherein the polyglycol compound has the formula of claim 9, wherein R' is an octyl group, $n_x$ is 2, $x$ is 10 and $y$ is 0.

14. The method of improving the heat sealing characteristic of a film to a like body comprising:

applying to the surface of an alkenyl aromatic resin film an aqueous solution of from about 0.025 percent to about 10 percent by weight (based on the total weight of the solution), of a polyglycol compound of the formula:

R—O[($C_{n_x}H_{2n_x}$)—O]$_x$—[$C_{n_y}H_{2n_y}$)—O]$_y$—H wherein $n_x$ and $n_y$ are integers from 2 to 3, $x$ and $y$ are integers having individual values of from 0 to 20 inclusive, and having a sum of from 1 to 20 inclusive, R is a member selected from the group consisting of (a) alkaryl radicals of the formula:

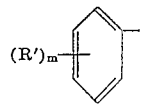

wherein $m$ is an integer from 1 to 4 and R' is an alkyl group containing 2 to 20 carbon atoms, and (b) alkyl radicals containing from 8 to 13 carbon atoms; to give a coating weight on said surface of from about 0.118 milligram per square foot to about 148 milligrams per square foot of said compound, drying said film at a temperature of from about 70° Fahrenheit to 185° Fahrenheit.

References Cited by the Examiner
UNITED STATES PATENTS

| | | |
|---|---|---|
| 2,393,863 | 1/1946 | Myers. |
| 2,948,696 | 8/1960 | Park. |
| 2,955,054 | 10/1960 | Park et al. |
| 3,022,178 | 2/1962 | Park et al. _____ 106—13 |
| 3,053,695 | 9/1962 | Park et al. |
| 3,220,904 | 11/1965 | Touey et al. _____ 156—167 |

EARL M. BERGERT, *Primary Examiner.*

HAROLD ANSHER, *Examiner.*